No. 783,496. Patented February 28, 1905.

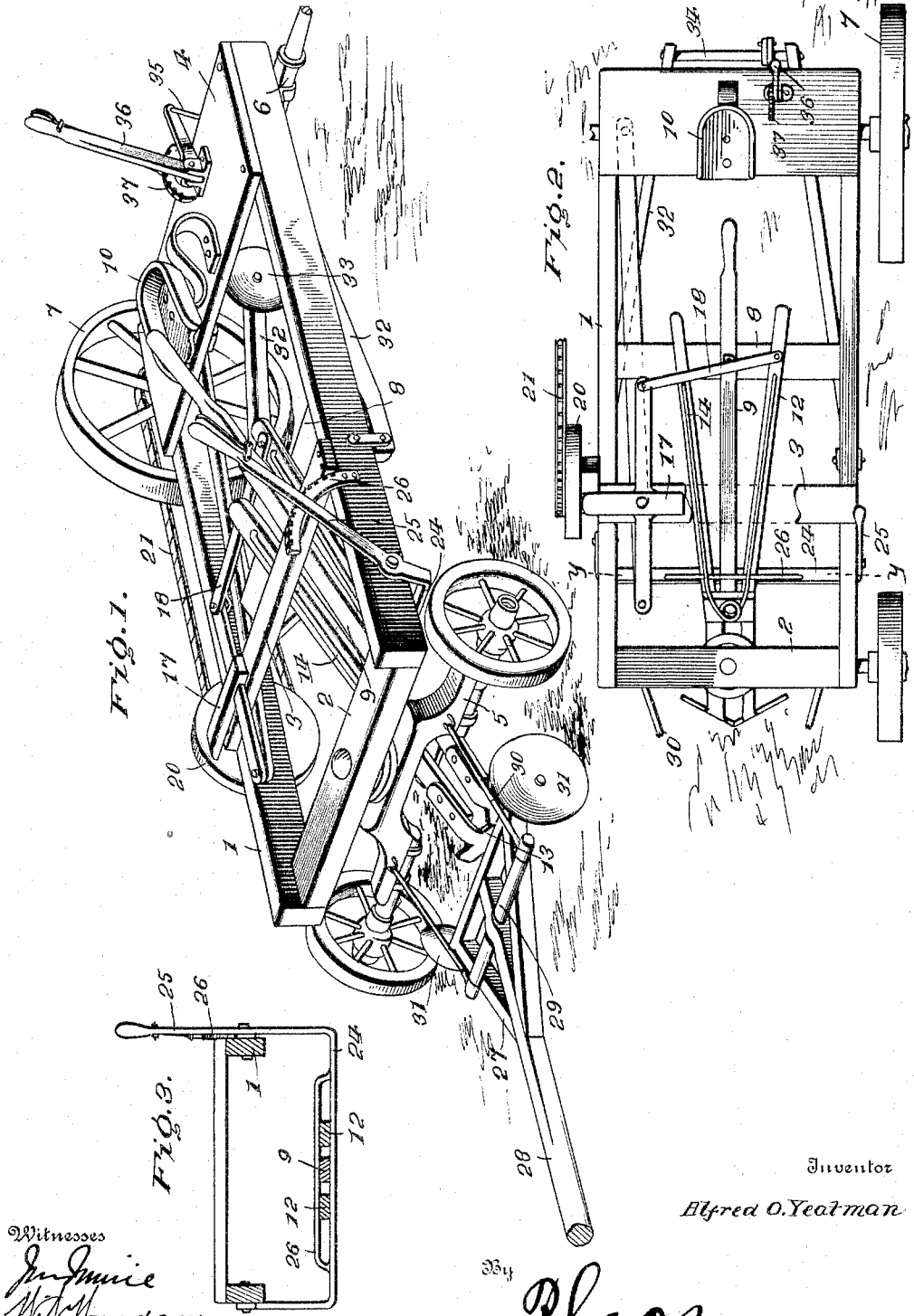

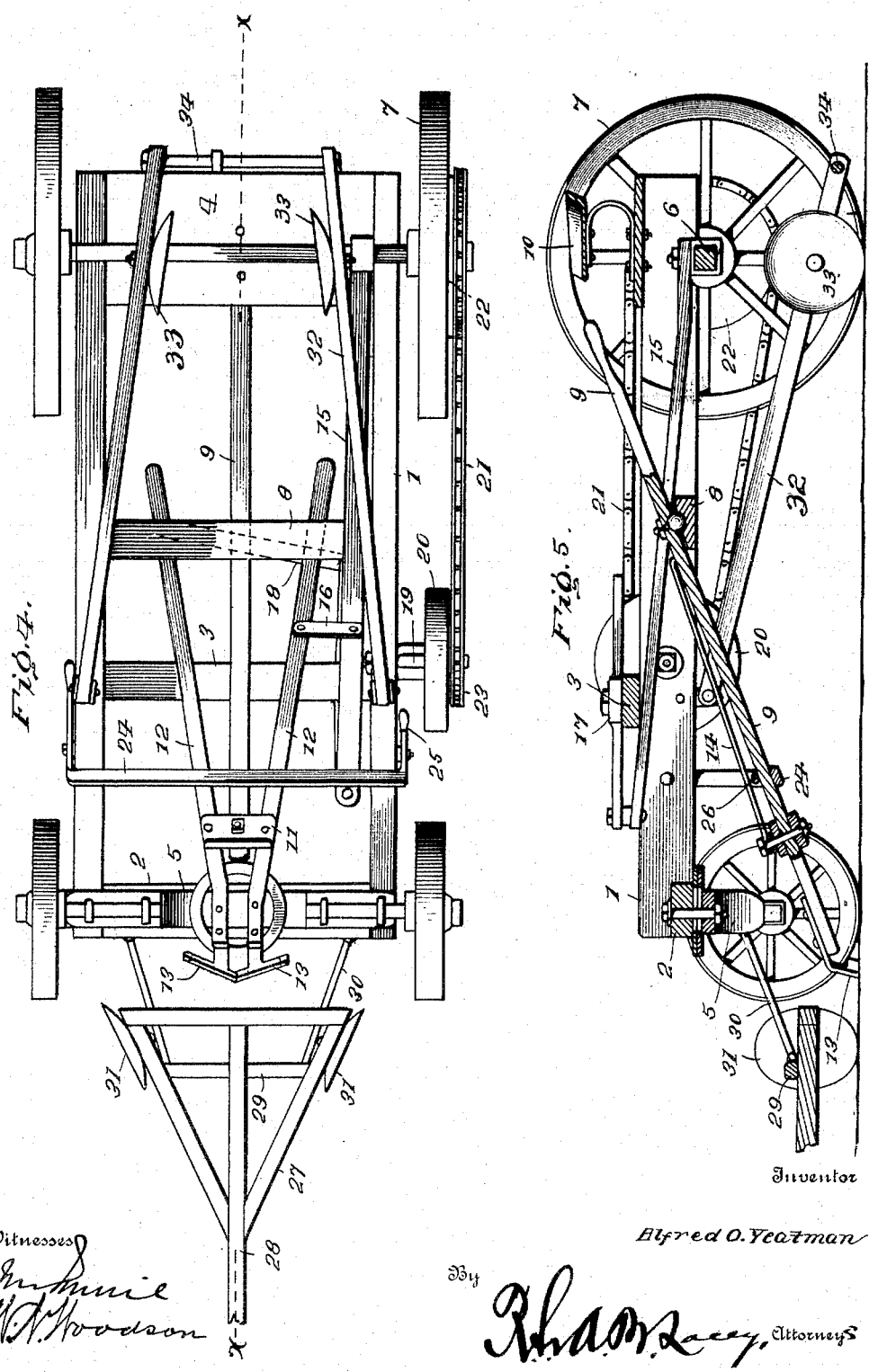

UNITED STATES PATENT OFFICE.

ALFRED O. YEATMAN, OF OKEENE, OKLAHOMA TERRITORY.

COTTON CULTIVATOR AND THINNER.

SPECIFICATION forming part of Letters Patent No. 783,496, dated February 28, 1905.

Application filed November 8, 1904. Serial No. 231,945.

*To all whom it may concern:*

Be it known that I, ALFRED O. YEATMAN, a citizen of the United States, residing at Okeene, in the county of Blaine, Territory of Oklahoma, have invented certain new and useful Improvements in Cotton Cultivators and Thinners, of which the following is a specification.

This invention provides an implement of novel structure for cultivating and thinning rows of cotton-plants at one operation and which is under control of the operator to admit of directing and raising and lowering the cutting mechanism without interfering with or deranging the mechanism by means of which power is transmitted to said cutting mechanism.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment thereof, is shown in the accompanying drawings, in which—

Figure 1 is a perspective view of an implement embodying the invention. Fig. 2 is a top plan view thereof. Fig. 3 is a section on the line *y y* of Fig. 2. Fig. 4 is a view of the implement inverted. Fig. 5 is a longitudinal section on the line *x x* of Fig. 4.

Corresponding and like parts are referred to in the following description and indicated in all the views of the drawings by the same reference characters.

The main frame of the implement comprises longitudinal bars 1 and cross-pieces 2, 3, and 4. The front axle 5 is connected with the front cross-piece 2 by the usual king-bolt and fifth-wheel. The rear axle 6 is clipped or otherwise attached to the rear portion of the frame and is provided with ground-wheels 7, loosely mounted on its arms. A beam 8 is journaled at its ends in the longitudinal bars 1 and supports a lever 9, pivotally connected thereto and having its rear end extended within convenient reach of the driver's seat 10. A cross-bar 11 is connected to the lower front end of the lever 9 and supports arms 12, pivoted thereto and provided at their lower front ends with blades 13, by means of which the thinning of the rows is accomplished. The rear ends of the pivoted arms 12 are forced apart by means of a spring 14, which in the present instance is approximately of V form and is connected at its apex to the cross-bar 11 and at its ends to the arms 12. A lever 15 is pivotally connected at its rear end to the axle 6 and is connected intermediate of its ends to the proximal arm 12 by means of a link 16. A T-lever 17 is pivoted to the cross-piece 3 and has its forward arm pivotally connected to the lever 15 and its rear arm connected by link 18 to the remote arm 12. The third arm of the T-lever 17 extends within the path of a trip 19, extended inward from a tappet-wheel 20. A sprocket-chain 21 transmits motion to the tappet-wheel 20 from one of the rear ground-wheels 7 and passes around a sprocket-wheel 22, connected to said ground-wheel, and a sprocket-wheel 23, connected or forming a part of the tappet-wheel 20.

When the implement is drawn over the field, rotary motion is imparted to the tappet-wheel 20 in the manner set forth, and the T-lever 17 is oscillated by means of the trip 19 coming in contact with the lateral arm thereof. The arms 12 are simultaneously moved in opposite directions by reason of their connection with, respectively, T-lever and longitudinal lever 15. As the rear ends of the arms 12 are drawn together the tension of the spring 14 is increased and the blades 13 are separated. The instant the lever 17 clears the tappet 19 the spring 14 reacts to move the rear ends of the arms 12 outward and to bring the blades 13 together. By proper manipulation of the lever 9 the cutting mechanism may be shifted laterally to follow any irregularities of a row or elevated or depressed to vary their action with reference to the surface of the ground.

A bail 24 is pivotally connected to the longitudinal bars 1 and is provided with an operating-lever 25 accessible from the driver's seat and provided with the usual hand-latch for coöperation with notched bar 26 to hold the bail in an adjusted position. The bail consists of a rod or bar having its end portions bent approximately at a right angle and pivotally connected to the bars 1 in any manner. A bar 26 is arranged parallel with the horizontal portion of the bail 24 and is connected at its ends thereto, leaving a space for the reception of the lever 9 and arms 12. When the lever 25 is secured, the lever 9 and arms 12 are prevented from vertical movement, but are free to move laterally. By manipulating the lever 25 the cutting mechanism may be raised or lowered and secured in the adjusted position. By throwing the hand-latch of the lever 25 out of action the cutting mechanism may be adjusted by means of the lever 9 both vertically and laterally.

The cutters 13 comprise horizontal blades and stems, the latter being rigidly attached to the front ends of the arms 12 and the inner ends of the blades overlapping or coming close together to insure removal of the plants intermediate of those left standing. The arms 12 being actuated at regular intervals effect separation of the cutters 13, whereby plants at regular intervals in a row are left standing.

A cultivator-frame 27 is arranged in advance of the cutting mechanism and is constructed to throw the earth away from the plants. The cultivator-frame is approximately of triangular form and is provided with a pole or tongue 28 and a cross-bar 29, the latter being connected at its ends by rods 30 to the axle 5. Cultivator-disks 31 are provided and arranged with their concave sides outwardly faced and at such an angle as to throw the earth outward. Cultivator-beams 32 are pivoted at their front ends to the longitudinal bars 1 and are provided at their rear ends with cultivator-disks 33, which have their concaved sides facing inward and arranged at such an angle as to throw the earth toward the plants to insure covering the roots thereof. A cross-piece 34 connects rear ends of the beams 32 and is connected by link 35 and the rear arm of an elbow-lever 36, fulcrumed upon the cross-piece 4 and provided with a hand-latch for coöperation with a toothed segment 37 to hold the part in an adjusted position.

The trips 19 may be provided in any number and secured to the tappet-wheel 20 in any determinate way, thereby providing for regulating the distance between the plants to be left standing in the operation of the machine.

Having thus described the invention, what is claimed as new is—

1. In combination, pivoted arms provided with blades, a lever, connecting means between said lever and one of the arms, a second lever, connecting means between the second lever and the other pivoted arm, connecting means between the first and second levers, and means for oscillating the second lever for imparting simultaneous pivotal movement to the aforesaid arms in opposite directions, substantially as set forth.

2. In combination, pivoted arms provided with blades, a longitudinal lever connected intermediate of its ends to one of the pivoted arms, a T-lever having one arm connected to the longitudinal and the diametrically opposite arm connected with the other pivoted arm, and a tappet mechanism for imparting oscillatory movement to the T-lever, substantially as and for the purpose set forth.

3. In an implement of the character described, the combination of a pivoted beam, a support pivoted thereto, arms pivotally connected with said support and provided with blades, longitudinal T-levers connected to each other and to respective pivoted arms, and a tappet mechanism for imparting an oscillatory movement to the T-lever, substantially as and for the purpose set forth.

In testimony whereof I affix my signature in presence of two witnesses.

ALFRED O. YEATMAN. [L. S.]

Witnesses:
H. H. DOHE,
T. H. GRENMELL.